July 30, 1963  J. D. McDANIELS, JR., ET AL  3,099,075
POWER OPERATED STUD TENSIONER
Filed Dec. 23, 1959  11 Sheets-Sheet 10

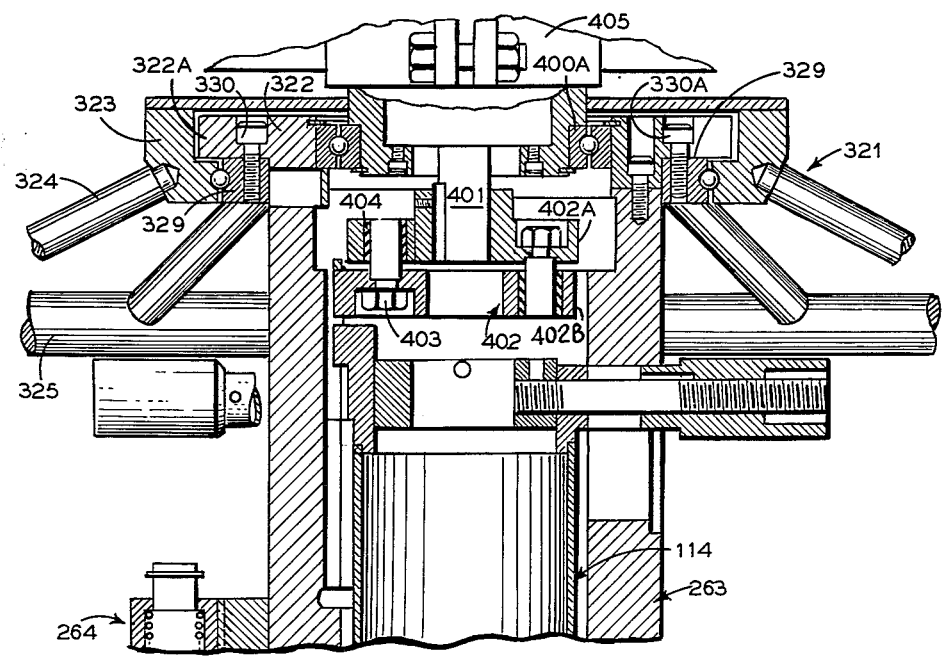
FIG. 22
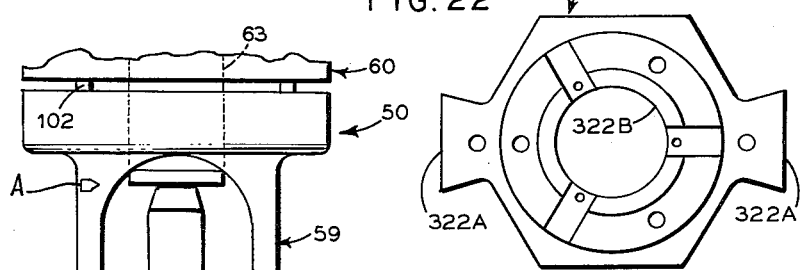
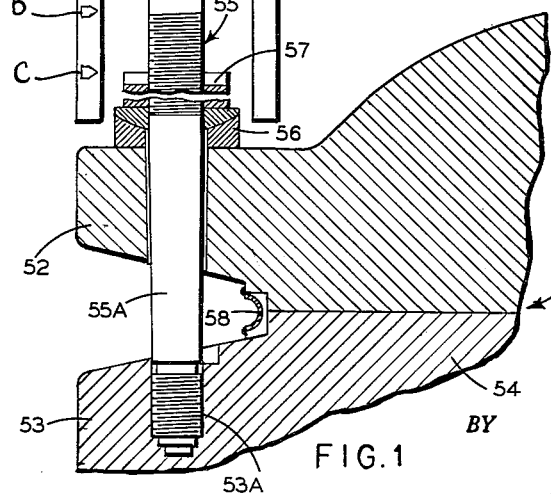
FIG. 22A
FIG. 1
INVENTORS
John Mc Daniels, Jr.
Leroy S. De Mart
BY
ATTORNEY July 30, 1963  J. D. McDANIELS, JR., ET AL  3,099,075
POWER OPERATED STUD TENSIONER
Filed Dec. 23, 1959  11 Sheets-Sheet 3
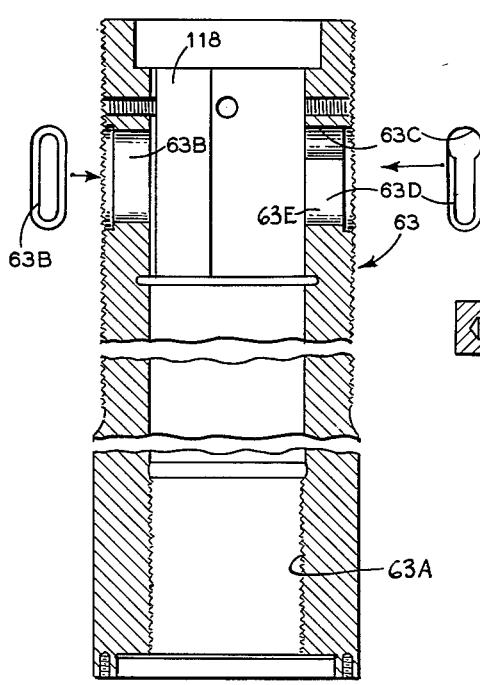
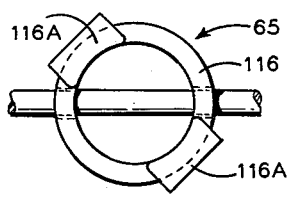
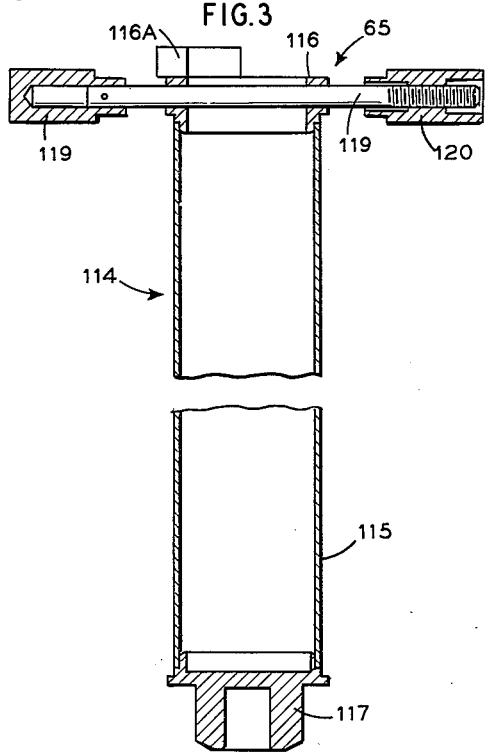
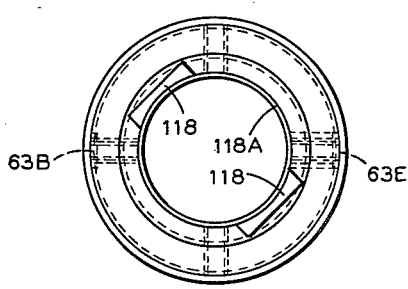
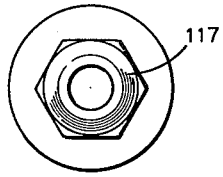
INVENTORS
John D. Mc Daniels, Jr.
Leroy S. De Mart
BY
ATTORNEY

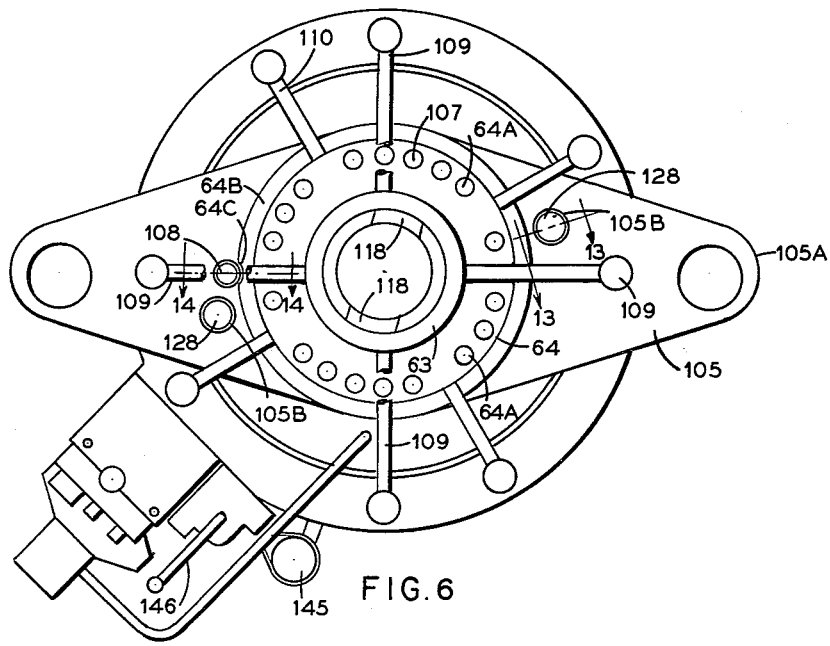
FIG.6
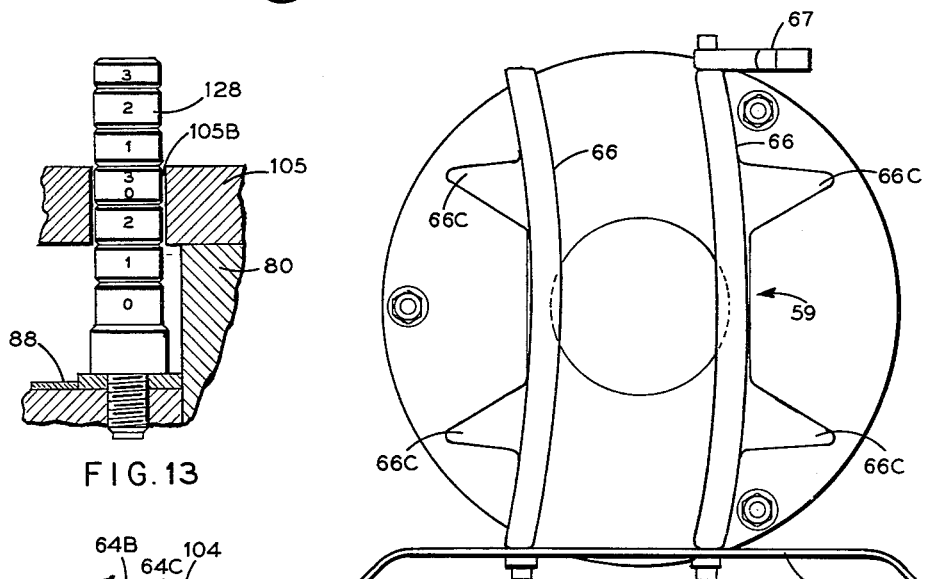
FIG.13
FIG.7
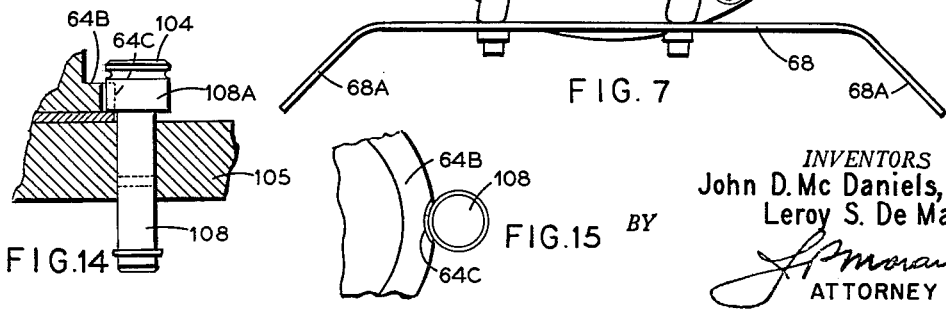
FIG.14
FIG.15
INVENTORS
John D. Mc Daniels, Jr.
Leroy S. De Mart
BY
ATTORNEY INVENTORS
John D. Mc Daniels, Jr.
Leroy S. De Mart
BY
ATTORNEY

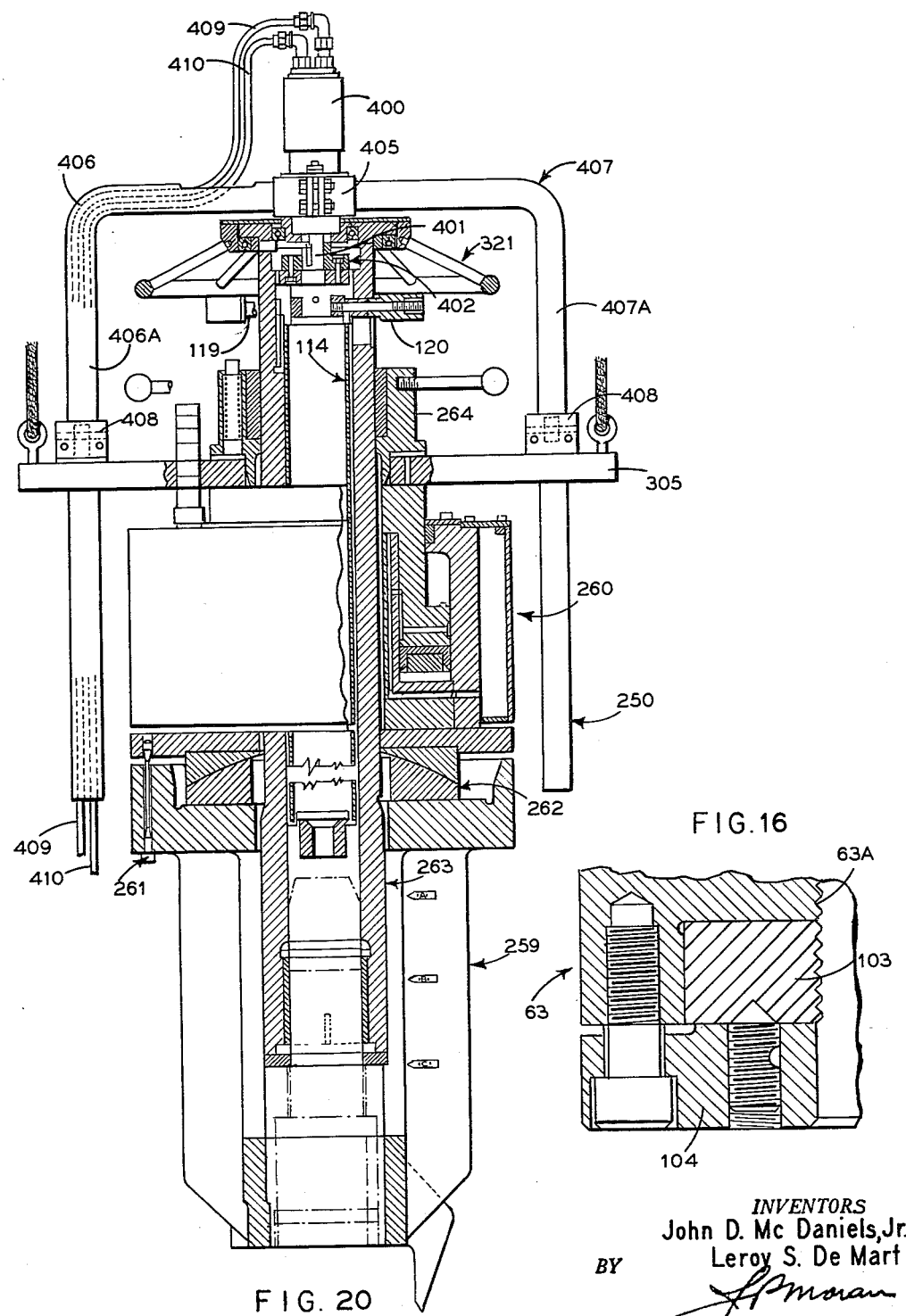

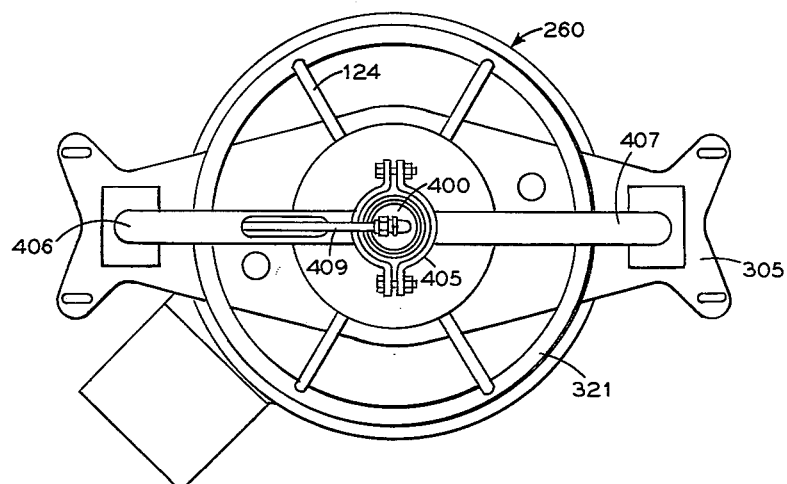
FIG. 21
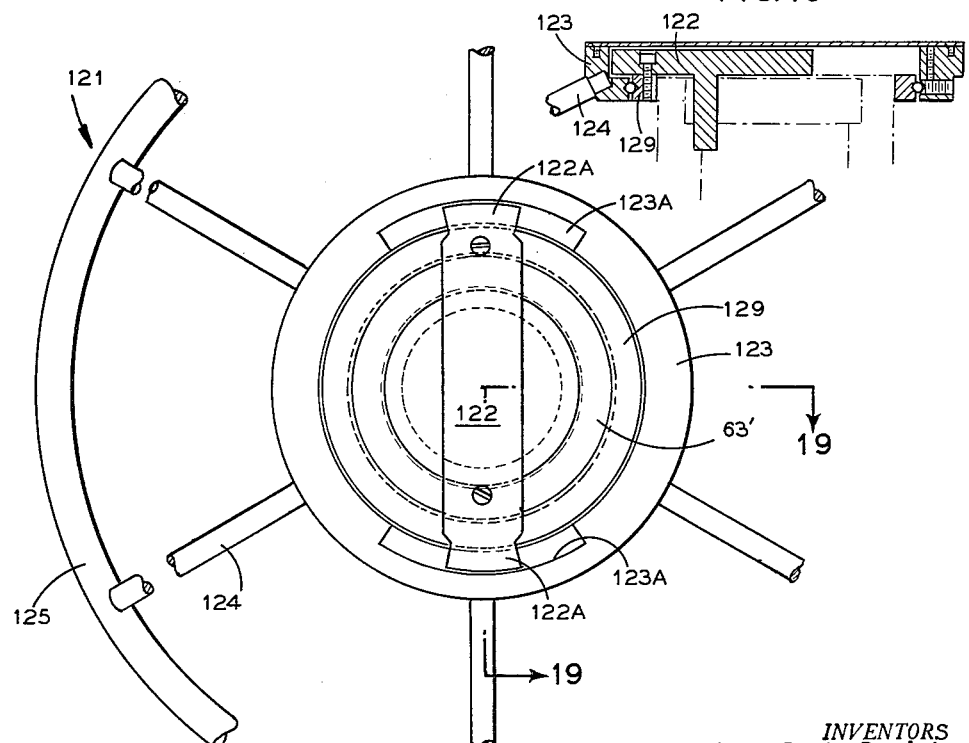
FIG. 19
FIG. 18

INVENTORS
John D. McDaniels, Jr.
Leroy S. De Mart
BY
ATTORNEY

INVENTORS
John D. Mc Daniels, Jr
Leroy S. De Mart
BY
ATTORNEY

United States Patent Office 3,099,075
Patented July 30, 1963

3,099,075
POWER OPERATED STUD TENSIONER
John D. McDaniels, Jr., Lynchburg, Va., and Le Roy S. De Mart, Lancaster, Ohio, assignors, by direct and mesne assignments, to The Babcock & Wilcox Company, New York, N.Y., a corporation of New Jersey
Filed Dec. 23, 1959, Ser. No. 861,675
13 Claims. (Cl. 29—240)

This invention relates to tensioners and more specifically to an improved fluid actuated stud or bolt tensioner.

The stud or bolt tensioner of the present invention, although not restricted thereto, is particularly useful for assembling and disassembling pressure vessel closures that are detachably connected to a vessel body by means of a plurality of stud and nut assemblies. The advantages of this type of pressure vessel design and the modern trend toward higher internal operating pressures brought into prominence the need for a means for readily assembling and disassembling relatively large diameter stud and nut assemblies, and for threading to, or unthreading from, a stud and its associated vessel part quickly and easily without causing damage to the stud threads, the vessel or any component part thereof.

In order that a closure on such vessels be properly secured, it is essential that the compressive force at the juncture between the closure and the body of the vessel be uniformly applied in a manner so as to avoid overstressing of the parts, while at the same time effecting a fluid tight seal therebetween. For this reason it is extremely important that the amount of tension placed in each of the studs be accurately controlled so the studs will not be stressed beyond the elastic limit of their material, and yet be sufficient to effect an adequate and uniform pull-down between the closure and the vessel body.

Heretofore, in performing a closure operation on a pressure vessel it had been customary to stress the studs in tension by turning down the associated nuts manually by means of a wrench or by thermally expanding the studs. The first method of applying torque to the nut with a wrench had the tendency to twist, bend or gall the stud. Also the torque method proved impractical for stressing large diameter studs because it required several operators working with a wrench having a lever arm of several feet to develop the force necessary to rotate the nut and thereby impart the requisite stress to the stud. Oftentimes space limitations would prohibit the application of this method.

The stud heating method, used sometimes in conjunction with the nut turning method, required a long period of time to effect the desired elongation, and an even longer time for the stud to cool. Further, uniform loading seldom resulted from either of these methods due to the difficulty in obtaining uniform elongation of the studs. Consequently, each of these methods proved tedious, time-consuming and generally unsatisfactory.

To overcome the disadvantages of the above mentioned methods, hydraulically operated tensioners have been used to physically or mechanically elongate the studs in tension so that the mating nut may be loosened or tightened thereon while free of the thread pressures. Also hydraulic tensioners enabled the operation to be performed without producing the high friction, galling or twisting effects associated with other techniques.

While hydraulically operated stud tensioners are not basically new, the known constructions are not readily adapted for safe operation in heavy duty work. Heretofore it had been customary to supply the hydraulic operating fluid under pressure to the cylinder and piston assembly through exposed, flexible, pressure lines connecting the tensioner with a remotely disposed source of fluid. Consequently, when these tensioners were employed at very high operating pressures, for example 10,000 to 17,000 p.s.i. and above, the exposed fluid lines subjected to such high pressures presented a definite hazard to the safety of both operating personnel and equipment in the event the supply line should break a connection or rupture for any reason.

Tensioners of the class to which the present invention relates consist of relatively heavy, bulky pieces of apparatus, oftentimes weighing several thousands of pounds. For this reason there is the concerning problem of securing the tensioner to the stud without causing damage to the stud threads, and in maneuvering and indexing the tensioner from stud to stud after each tensioning operation with ease, rapidity and simplicity.

Also the known hydraulic stud tensioner constructions are such that their functions are strictly limited to that of merely stressing studs in tension. In the event it was necessary to remove or unthread a stud from its mated part, as is oftentimes required in opening certain types of pressure vessel constructions, as for example a chemical or nuclear reactor vessel having a seal weld located within the stud circle, and circumscribing the junction of the cover and vessel body, a separate tool was required.

An object of this invention is to provide an improved fluid actuated stud tensioner capable of conveniently stressing the large diameter studs in tension accurately and uniformly in a relatively short period of time.

Another object of the invention is to provide an improved hydraulically operated stud tensioner capable of applying an extremly large force, as for example 1,200,-000 lbs., accurately and in a relative short period of time in which there are no exposed high pressure hydraulic lines to endanger personnel and property.

Another object is to provide a stud tensioner arranged and constructed to facilitate the assembly and disassembly of the tensioner to the stud to be tensioned while at the same time materially diminishing the probability of damaging the threads on the stud during such operations.

Another object of the invention is to provide a pneumatic arrangement for enhancing maneuverability of the tensioner to facilitate indexing of the same from one stud to another.

Still another object of the invention is to provide a stud tensioner construction capable of alternately performing other operations in addition to that of stressing a stud in tension.

In accordance with this invention the foregoing objects and other features and advantages are attained by a stud tensioner comprising essentially a pedestal, a power pack in the form of a cylinder and piston assembly connected to the pedestal by means of a flexible coupling, a universal joint disposed between the pedestal and power pack to accommodate for misalignment, and a hollow drawbar constructed and arranged so as to be readily attached and detached from both the stud to be tensioned and the cylinder-piston assembly.

The piston means is slidably mounted within the cylinder and is provided with a bore for receiving the drawbar. In the assembled position the drawbar forms an axial extension of the stud and projects upwardly through the pedestal and piston. A thrust nut having means for counterbalancing the weight of the drawbar releasably connects the upper end of the drawbar to the power pack unit.

The arrangement is such that the piston means is double-acting, i.e. the piston means is hydraulically operated on the up-stroke for exerting a force on the drawbar, which in turn transmits the force in tension to the stud, and pneumatically operated on the down stroke which releases the tension on the stud and raises the tensioner off its support to facilitate indexing of the tensioner from stud to stud. This latter action constitutes a built-in jacking feature.

According to this invention the reservoir for containing the piston actuating, hydraulic fluid is formed as an integral part of the cylinder and piston assembly.

Movement and position of the piston is had by a compact control unit which includes a low pressure, pneumatically operated hydraulic pump connected to the wall of the power pack to pump fluid between the cylinder and reservoir integrally formed therewith, an air regulator means, a fourway air valve and a two-way hydraulic valve operatively connected thereto. The valves are sequentially controlled by a single operating lever to selectively direct either the flow of hydraulic fluid to one side of the piston, or the flow of a pneumatic fluid to the other side of the piston, depending upon the setting of the lever.

To render the tensioner a more versatile tool, a stud extractor may be disposed within the hollow drawbar for movement between operative and inoperative position. In the operative position the extractor locks the stud to the drawbar so that upon rotation of the latter the stud is rotated, thereby threading or unthreading the stud to its mating vessel part depending on the direction of rotation.

Stud extraction is facilitated in the event of stud seizure by a hammering means connected to the upper portion of the drawbar. The arrangement of the hammering means is such that a sharp initial impact, sufficient to jar loose a seized stud, may be imparted to the seized stud, whereupon subsequent extraction of the stud may be readily accomplished by continued rotation of the drawbar.

In another form of the invention, rotation of the drawbar for engaging the stud or for extracting the stud, when the extractor is rendered operative, is facilitated by means of a pneumatically operated motor coupled to the drawbar. In this embodiment a second four-way air valve is included in the control circuit to control the operation of the air motor for regulating the direction of rotation of the drawbar. The arrangement is such that the air valve controlling the rotation of the drawbar and the air valve controlling the operation of the piston are physically and mechanically connected to an operating lever so that only one lever is required to selectively actuate either piston displacement or drawbar rotation.

A feature of this invention resides in the provision that there are no exposed high pressure lines for supplying the cylinder with pressurized fluid to create a potential hazard to either operating personnel and/or equipment.

Another feature resides in the provision of means to allow tension to be applied to the stud to be stressed without the danger of bending the stud and/or binding of the piston in the cylinder due to misalignment of the tensioner relative to the stud, thereby permitting the tensioner to pull evenly and uniformly.

Still another feature resides in the means incorporated in the thrust nut for counterbalancing the weight of the drawbar to facilitate initial engagement thereof with the stud to be tensioned.

Still another feature resides in the provision of a hammering means for imparting a sudden impact to seized studs for loosening the same to facilitate the removal thereof during a stud extraction operation.

Another feature resides in the provision of a non-metallic thread starting ring connected to the end of the drawbar to prevent metal to metal thread contact during initial engagement of the drawbar with a stud.

Another feature resides in the provision of a versatile tensioner, that includes means to perform a stud extraction operation, and which operates with speed, precision and uniformity while at the same time providing maximum protection to the stud.

Still another feature resides in the provision of a control circuit including pump, valves, and pressure regulator arranged as a compact assembly affixed to the tensioner to control the operation of the same.

The various features of novelty which characterize this invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a diagrammatic view illustrating a fragmentary portion of the tensioner in position over a stud and nut assembly for securing a closure member to the body of a heavy duty pressure vessel.

FIG. 2A is a detailed view of the drawbar.

FIG. 2B is a plan view of FIG. 2A.

FIG. 3 is a detailed view of a stud extractor, shown in section, for use with the tensioner.

FIG. 4 is a top view of the extractor of FIG. 3.

FIG. 5 is a bottom view of the extractor of FIG. 3.

FIG. 6 is a top view of the tensioner of FIG. 2.

FIG. 7 is a bottom view of the tensioner of FIG. 2.

FIG. 13 is a detailed view of a guide pin taken along line 13—13 of FIG. 6.

FIG. 14 is a detailed sectional view of a lock pin taken along line 14—14 of FIG. 6.

FIG. 15 is a fragmentary plan view of FIG. 14.

FIG. 16 is an enlarged detail of the drawbar lead-on insert shown in section.

FIG. 18 illustrates a modification to the tensioner of FIG. 2 to include a hammering means associated with the drawbar.

FIG. 19 is a sectional view taken along line 19—19 of FIG. 18.

FIG. 20 is an elevation view of a modified tensioner, having portions thereof shown in section.

FIG. 21 is a plan view of the tensioner of FIG. 20.

FIG. 22 is an enlarged vertical section view taken through the upper end of the drawbar of the tensioner illustrated in FIG. 20.

FIG. 22A is a detailed plan view of the anvil embodied in the form of the invention illustrated in FIG. 20.

Figure 2:
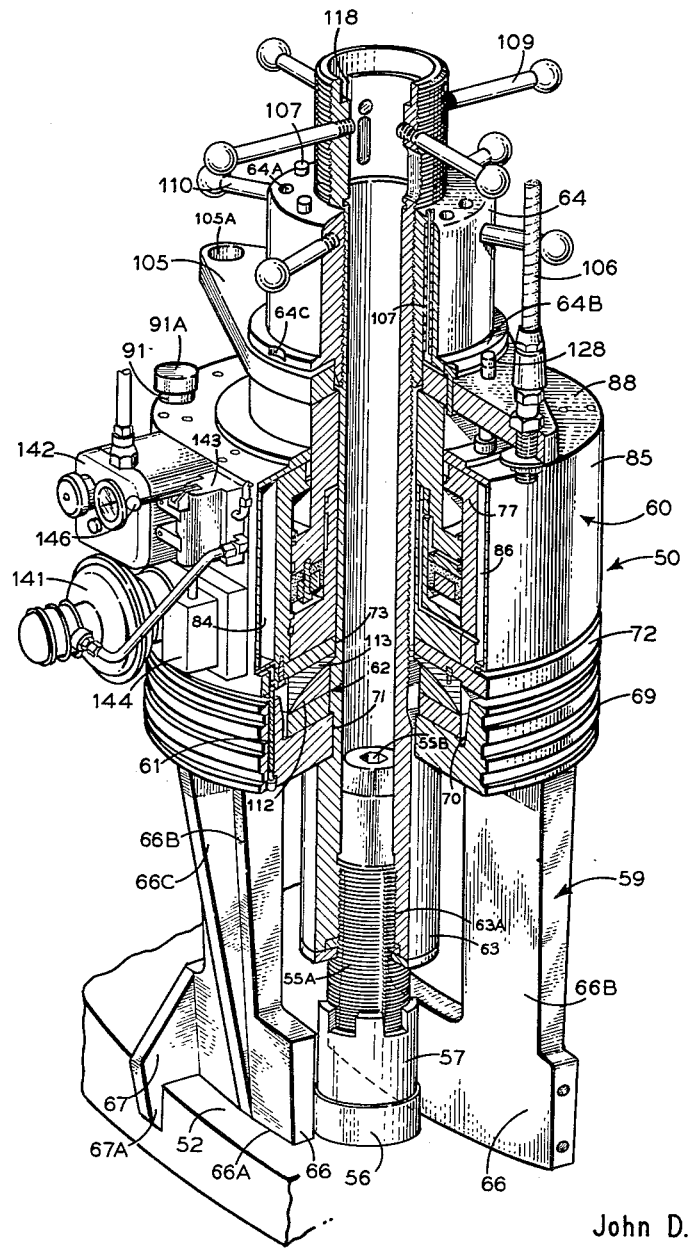
FIG. 2 is an isometric view of the tensioner having a portion thereof shown in section.

Referring to FIGS. 1 and 2, the stud tensioner 50 of this invention is shown and described with particular reference to a heavy duty pressure vessel 51, such as a nuclear reactor vessel. However, it is to be understood that the tensioner is equally adaptable to other applications, such as for the assembly and disassembly of high pressure turbine shells, autoclaves, high pressure heaters, and in fact, for any heavy duty work which requires tightening and loosening nuts on large diameter studs or bolts. The tensioner to be herein described weighs approximately two tons, is 26 inches in diameter, 70 inches high and has a capacity of 600 tons with a piston stroke of approximately 3 inches.

In FIG. 1 the pressure vessel 51 is shown as including a flanged closure 52 secured to a corresponding flange 53 of the vessel body 54 by means of a plurality of nut and stud assemblies 55. Included as part of each nut and stud assembly 55 is a spherical washer set 56 disposed between the nut 57 and flanged closure 52 to insure that the forces exerted by the nut 57 are applied normal to the flanged closure 52. Generally the stud assemblies 55 are arranged in a stud circle with each stud 55A being threaded into a tapped hole 53A in the flange 53 of the vessel body. In vessels of this type a seal weld 58 within the stud circle, is sometimes employed to circumscribe the line of junction between the closure and the vessel body. In high pressure vessels of this type, it is not uncommon for the studs to have a diameter of 4 inches or more.

The tensioner 50 (FIG. 2) comprises essentially a pedestal 59, a power pack unit 60 connected to the pedestal 59 through the medium of a flexible coupling means 61, a universal joint 62 disposed between the pedestal 59 and power pack 60 to accommodate for misalignment which may occur between the respective center lines of the tensioner 50 and the stud 55A to be stressed, and a hollow drawbar 63, adustably connected to the pedestal-power pack assembly through the medium of a trust nut 64. The hollow drawbar 63 is arranged to engage the stud 55A to be tensioned and extends upwardly through the pedestal 59 and power pack 60. The arrangement is such that the power pack exerts a force in tension which is transmitted through the drawbar 63 to the stud 55A to axially elongate the same.

To render the tensioner 50 a more versatile tool, a stud extractor means 65, illustrated in FIGS. 3 to 5, may be disposed within the hollow drawbar 63. As will be hereinafter described, the extractor 65 is arranged for movement between operative and inoperative positions within the drawbar 63.

The pedestal 59 forming the support and main compressive member of the tensioner 50, when loaded, consists of a pair of arcuate, U-shaped stanchions 66, as shown in FIG. 2, spaced parallel to one another and arranged to straddle a stud 55A to be tensioned. In operative position, the base 66A of the U-shaped stanchions 66 engages the flanged closure 52. The open end construction of the pedestal afforded by the curved parallel stanchions 66 enables the tensioner 50 to traverse the stud circle without requiring the tensioner to be lifted above the height of the studs. With this construction the tensioner 50 itself need only be raised an amount sufficient to lift the pedestal 59 off the flange 52 to facilitate indexing the tensioner from one stud to another. As will be hereinafter described, an integral jacking feature is employed to raise the tensioner off the flange 52 in preparation for indexing the tensioner from one stud to another. With this arrangement the delicate stud threads are protected against impact by the tensioner as might be occasioned during an indexing operation. Thus any mismovement of the tensioner during indexing will be limited to the tensioner contacting the nut 57, rather than the delicate stud threads extending above the nut.

The pedestal 59 is designed so that in the operative position the stanchions 66 are positioned entirely within the periphery of the closure flange 52 while straddling the stud. The stanchions 66 are substantially identical and provide equal bearing area for the tensioner on diametrically opposite sides of the stud. Thus the pedestal construction assures that each stanchion 66 will be equally loaded when the stud is stressed in tension. To increase the section modulus of the pedestal, legs 66B of the stanchion are provided with a gusset 66C.

To facilitate positioning of the pedestal 59 relative to the respective studs 55A during an indexing operation, a guide means is provided. The guide means includes a plate 67, see FIG. 2, having a dependent finger portion 67A arranged to follow the vertical edge or contour of the cover flange 52. Such guide means are removably secured to each end of the outboard stanchion 66. Interchangeable with these guide plates 67 may be a bracket 68, see FIG. 7, arranged to extend transversely of the stanchions. The purpose of the bracket 68 is to facilitate storage and/or to provide the tensioner with greater lateral stability if necessary. Bracket 68 generally consists of a flat, rectangular plate having outwardly turned end portions 68A.

Connected to the upper end of the stanchions 66 is a circular member 69 for supporting the power pack 60. As shown, member 69 is provided with a recessed portion 70 and a central opening 71 through which the drawbar 63 extends.

The power pack unit 60 comprises a combined reservoir and cylinder-piston assembly secured by suitable fastening means to base plate 72. The base plate is provided with a central opening 73 arranged in axial alignment with the opening 71 of the support plate 69.

Figure 8:
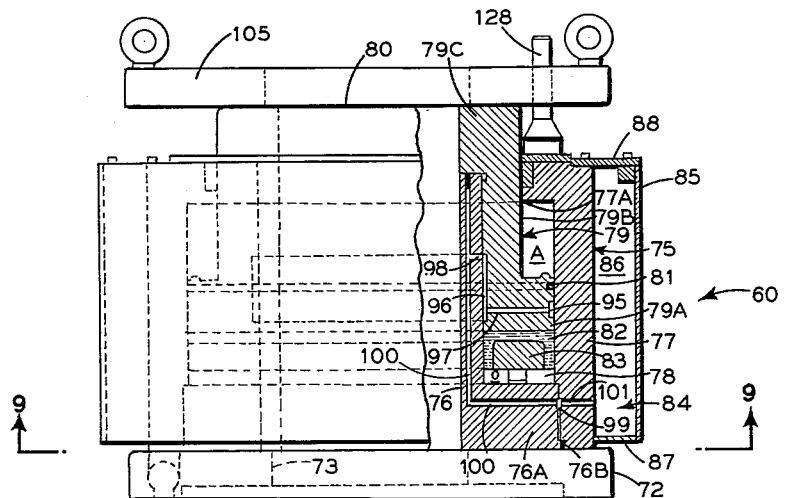
FIG. 8 is a detailed side elevation view of the hydraulic piston-cylinder assembly having portions thereof shown in section.
Figure 9:
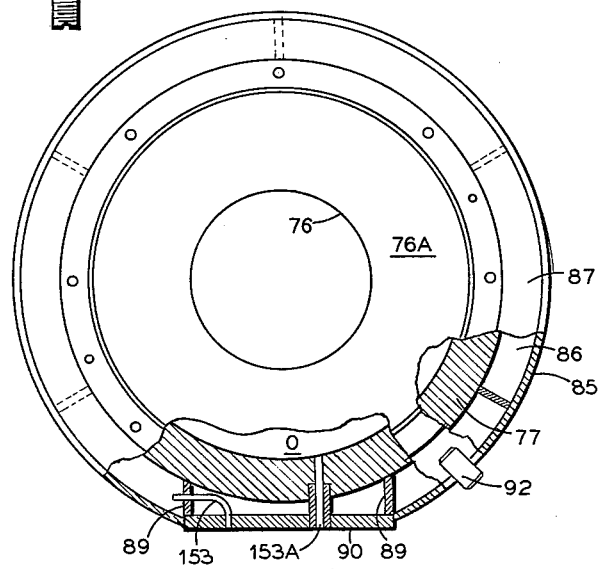
FIG. 9 is a detailed view taken along line 9—9 of FIG. 8, having portions thereof shown in section.
Figure 10:
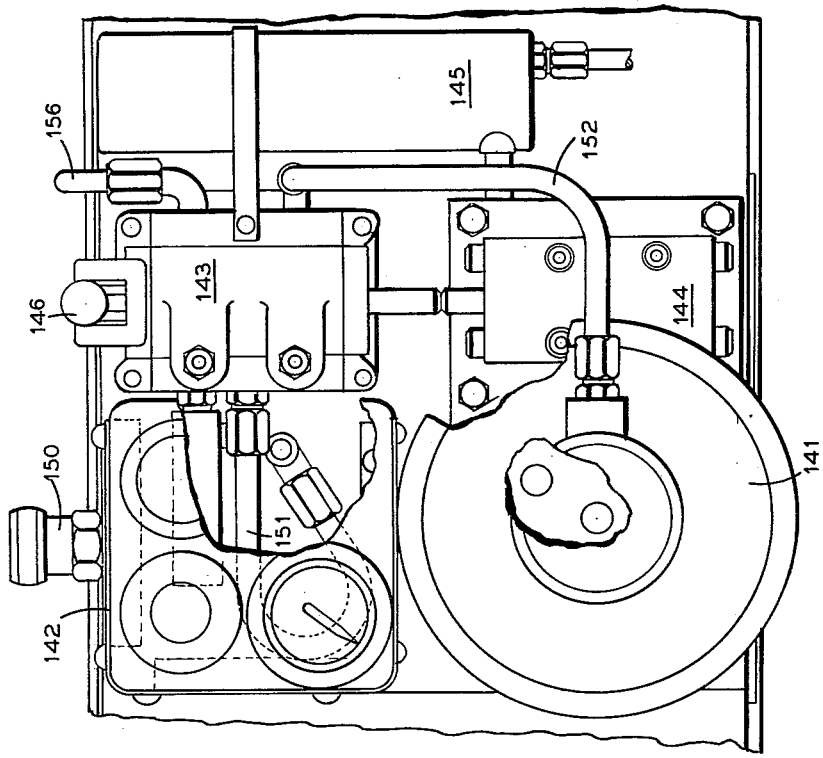
FIG. 10 is a detailed front elevation of the compact control assembly mounted on the piston and cylinder assembly.
Figure 11:
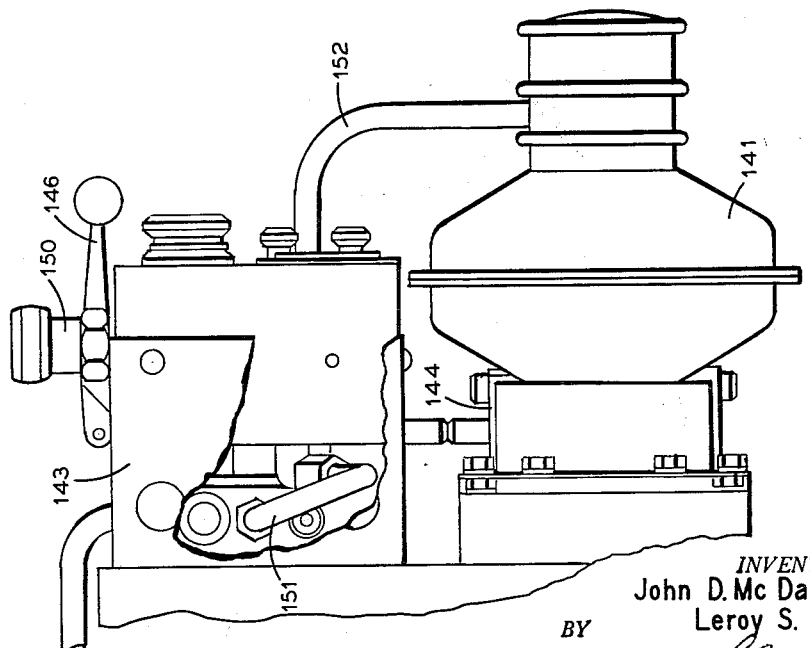
FIG. 11 is the left end view of FIG. 10.
Figure 12:
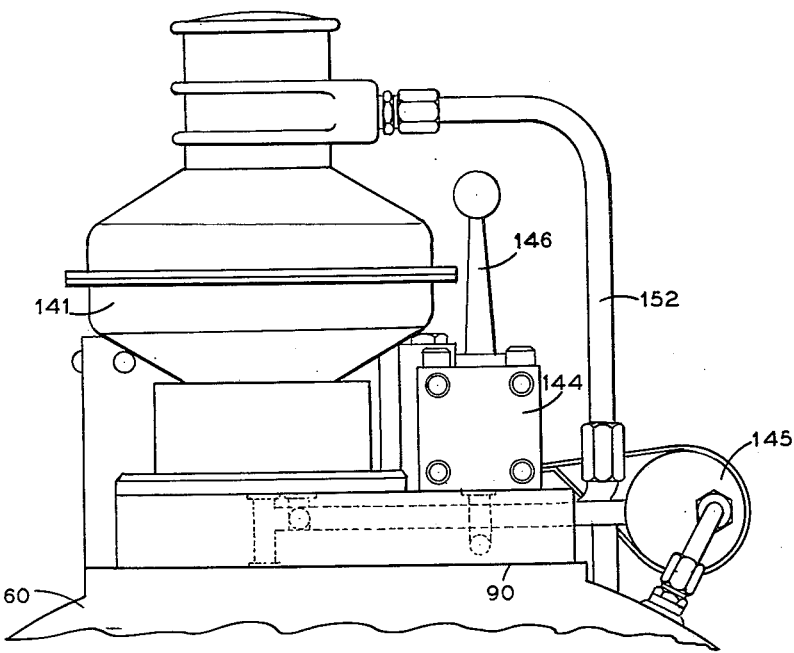
FIG. 12 is a bottom view of FIG. 10.

Referring to FIGS. 8 and 9, the cylinder portion 75 of the power pack assembly 60 is made up of spaced inner and outer annular members 76, 77, respectively, to define therebetween a fluid receiving annular chamber 78 concentrically disposed about aligned opening 73 of the base plate. The inner member 76 is provided with a radial flange 76A in engagement with the base plate 72, flange 76A forming the bottom closure of annular chamber 78. A suitable seal 76B is provided at the juncture of the radial flange 76A and the outer cylinder member 77 to insure against fluid leakage thereat.

Suitably disposed within the fluid receiving chamber 78 is piston 79 having an annular piston head 79A connected to an annular stem 79B extending upwardly through the upper end of the chamber 78. The upper end of the stem 79B is provided with an inturned flange portion 79C to form a piston ram 80. The outer cylinder member 77 is provided with an inturned flange 77A to define the upper limit of chamber 78 and to engage the piston stem 79B in sealing relationship.

In effect, the piston head 79A divides the annular chamber 78 into upper and lower expansible fluid receiving chambers A and O, respectively. Thus, according to this invention, the piston 79 is double-acting, i.e. the piston 79 is hydraulically operated on the up-stroke by introducing fluid under pressure into chamber O for exerting a force in tension on the drawbar 63, which in turn is transmitted to the stud; and pneumatically operated on the down-stroke by introducing fluid under pressure into chamber A to provide for an integral jacking feature, as will be herein described. As shown in FIG. 8, the piston head 79A is provided with a suitable air seal 81 adjacent its upper face and a suitable liquid seal 82 adjacent its lower face, the latter being removably secured by means of a retaining ring 83 at the lower and thereof.

A novel feature of this invention resides in the reservoir 84 which is formed as an integral part of the power pack. As shown in FIGS. 2, 8 and 9, the reservoir 84 is formed by an outer jacket 85 spaced from the outer cylinder member 77 to define therebetween a reservoir chamber 86 for containing the hydraulic fluid required to actuate the piston when a force in tension is applied to the stud. The bottom of the reservoir chamber 86 is closed by an annular bottom plate 87 welded to the cylinder 77 and to the outer jacket 85. The top of the reservoir chamber 86 is closed by a cover plate 88.

As shown in FIG. 9, reservoir jacket 85 encompasses the major circumference of the cylinder 77, and has its end limits defined by spaced end walls 89. Bridged between the end walls 89 of the reservoir is a mounting plate 90 to which is attached the compact control assembly of the tensioner, as will be hereinafter described.

A fluid filler opening 91 (FIG. 2) closed by a suitable cap 91A is provided in the top plate 88 of the reservoir and a suitable drain 92 (FIG. 9) by which the reservoir may be emptied is provided adjacent the bottom plate 87 of the reservoir. If desired, a gauge (not shown) may be provided to indicate the level of the hydraulic fluid in the reservoir.

Cylinder venting means are provided to prevent damage resulting from the leakage of the hydraulic fluid past the piston head 79A and into space A during a stud tensioning operation. As shown in FIG. 8, the piston head 79A is provided with an outer annular groove 95 and a wider inner annular groove 96 located above the oil seal 82. Interconnecting grooves 95 and 96 are one or more passageways 97. The inner groove 96 communicates with a passageway 98 disposed in cylinder member 76. Passageway 98 in turn connects with annular groove 99 in the edge of flange 76A through a return fluid passageway 100. Groove 99 in turn connects with passageway 101 discharging into the reservoir chamber 86. Consequently any hydraulic fluid which succeeds in by-passing the piston seal 82 during a tensioning operation is returned to the reservoir chamber 86 via connecting grooves and passageways 95, 97, 96, 98, 100, 99 and 101.

According to this invention, the pedestal 59 and power pack 60 are connected by means of a flexible coupling. As shown in FIGS. 2 and 8, the coupling 61 comprises a plurality of flexible links 102, e.g. wire rope or chain, circumferentially spaced about the periphery thereof. Three such links 102, spaced 120° apart, are sufficient to form the desired flexible coupling. By means of the flexible links 102 the pedestal 59 is rendered self-aligning with respect to the power pack 60 as the tensioner is positioned over a stud to be tensioned.

The drawbar 63, FIGS. 2 and 2A, consists of an elongated tubular member which has an internally threaded portion 63A at its lower end by which it may be readily threaded to a stud 55A (see FIG. 2) to be tensioned. To protect the delicate stud threads from being damaged by the drawbar during initial engagement, the drawbar is provided with a threaded lead-on insert 103, see FIG. 16, formed of a relatively soft material, e.g. nylon or of any of the soft metals. Thus, in case of misalignment between the threads 63A of the drawbar with those of the stud 55A on initial engagement, the insert 103 would suffer the damage rather than the fine threads of the stud. To facilitate replacement of the insert 103, a readily removable retainer ring 104 secures the insert 103 to the lower end of the drawbar.

The drawbar 63 forms an axial extension of the stud to be stressed as it extends upwardly through the opening 71 in the pedestal and the bore of the annular cylinder-piston assembly. The upper end of the drawbar, which extends beyond the top of the power pack cylinder-piston assembly of FIG. 8, is externally threaded for receiving a thrust nut 64, FIG. 2, which permits adjustment of the height of the drawbar 63, while at the same time rendering the drawbar readily detachable relative to the power pack 60 and pedestal 59 assembly.

With this construction the connected power pack and pedestal assembly can accommodate a wide range of stud sizes, when it is noted that only the drawbar 63 is required to be sized to the stud to be stressed. This feature greatly adds to the versatility of the tool.

As shown in FIGS. 2 and 8, disposed between the thrust nut 64 and the piston ram 80 is a hanger plate 105 having extended portions 105A to which hoisting cables 106 are connected. The hoisting cables 106 are arranged to connect to a suitable crane or other rig (not shown) for supporting the tensioner and to facilitate positioning the same over a stud.

In the arrangement described, the force exerted by the ram of piston 80 on the upward stroke of the piston 79 during a stud stressing operation is transmitted through the hanger plate 105 to the thrust nut 64. The thrust nut 64 in turn transmits the force to the drawbar 63, thereby producing the tension force to the stud 55A.

To indicate the position of the piston 79 within the cylinder, a piston indicator in the form of guide pins 128 is provided. Referring to FIGS. 6 and 13, the guide pins 128 are fixed to top 88 of the cylinder assembly and extend upwardly through an aligned opening 105B in the hanger plate 105. As shown in FIG. 6, diametrically opposed guide pins 128 are provided. The guide pins 128 have digitized indices, as shown in FIG. 13, to indicate the relative position of the piston with respect to the cylinder. Since the guide pins 128 are fixed to the top 88 of the cylinder assembly, piston travel is indicated by noting from the indices the change in elevation of the hanger plate 105 against which the piston bears, the change in elevation of the hanger plate 105 being of necessity equal to the piston travel. The guide pins 128 are indexed so that an elevation reading may be made by observing the position of either the upper or lower surface of the hanger plate 105.

According to this invention the thrust nut 64 is provided with means to counter-balance the weight of the drawbar 63 to facilitate manipulation of the drawbar during initial engagement thereof with the stud to be tensioned. As shown in FIGS. 2 and 6, the thrust nut 64 is provided with a plurality of circumferentially spaced bores 64A. Disposed within each bore 64A is a spring loaded plunger 107 to float the thrust nut 64 and connected drawbar 63 on the hanger plate 105 when the tensioner is not loaded.

To provide for the relative rotation between the drawbar 63 and thrust nut 64 necessary to thread the drawbar to the stud, means are provided for locking the thrust nut 64 to the hanger plate 105. As shown, in FIGS. 2, 6 and 14, the thrust nut 64 has a flange 64B at the base thereof. The flange 64B is provided with a plurality of peripheral notches 64C circumferentially spaced therearound adapted to receive a locking pin 108, FIG. 6.

The locking pin 108 consists essentially of a vertically adjustable pin having an enlarged head 108A arranged to register with notches 64C when the two are in alignment. With the pin in the up or elevated position, the thrust nut 64 is free to rotate upon rotation of the drawbar 63 since the flange 64B of the thrust nut 64 is free to pass beneath the enlarged head 108A of the lock pin 108. Locking of the thrust nut 64 is attained by aligning one of the flange notches 64C with the head 108A of the pin and pressing the pin down so that the head 108 of the pin is received in the notch 64C. With the pin 108 engaged in notch 64C the thrust nut 64 is locked to the hanger plate 105, and is incapable of rotating relative to the drawbar 63, when the latter is rotated. FIGS. 14 and 15 illustrate the locking pin 108 securing the thrust nut 64 in locked position.

Radial spokes or arms 109, 110 are connected to the upper end of the drawbar 63 and of the thrust nut 64, respectively, to facilitate rotation of these components.

Means are disposed between the base plate 72 and the pedestal 59 to compensate for misalignment which might occur between the center line of the tensioner 50 and the center line of the stud 55A as might be occasioned by flange rotation, lateral displacement of the tensioner relative to the stud, or uneven bearing surfaces. As shown in FIG. 2 the means comprises a universal joint 62 consisting of a spherical washer set. The washer set includes lower and upper washers 112, 113, respectively. The upper portion of the lower washer 112 is provided with a spherical concave surface and the lower portion of the upper washer 113 is provided with a complementary convex spherical surface adapted to receive the concave surface of the lower washer. Thus the universal joint 62 permits axial alignment of the tensioner and the stud, and thereby prevents binding of the piston within the cylinder during a stressing operation while allowing the tensioner to exert uniform, evenly distributed stresses.

In order that the tensioner may be rendered a more versatile tool, a stud extractor means 114, as shown in FIGS. 3, 4, and 5, may be incorporated within the hollow drawbar 63 to facilitate the removal of studs for any reason, as for example during a seal weld cutting operation. The stud extractor means 114 comprises a guide tube 115 having a drive head 116 connected at its upper end, and a male hexagonal plug 117 connected to its lower end, adaptable for engaging a hex socket 55B, FIG. 2, in the upper end of the stud 55A when the extractor 114 is rendered operative. The drive head 116 is provided with opposed drive keys 116A which are arranged to be received in corresponding vertical, internally disposed keyways 118, FIGS. 2 and 2B, formed in the drawbar 63.

The extractor 114 is arranged to be disposed within the drawbar 63 in axial alignment therewith and provision is made for lowering and raising it, such positions defining the operative and inoperative positions, respectively. Diametrically opposed hanger arms 119, extending radially of the extractor guide tube, are extended through opposed slotted openings 63E, 63B, see FIGS. 2 and 2A, of the drawbar to guide the extractor between the raised, inoperative position and the lowered, operative position within the drawbar 63.

To stow the stud extractor 114 within the drawbar 63 in the up, or inoperative position, one of the hanger guide slots 63E is provided with an enlarged opening 63C at its upper end as shown in FIG. 2A. According to this invention a hanger rod handle 120, FIG. 3, is threaded to the hanger arm 119, extending through slot 63E. The diameter of the hanger rod handle 120 is slightly less than that of the enlarged end 63C of the slot 63E, but greater than the width of the elongated slotted portion 63D. Thus when the stud extractor 114 is not in use it is raised to the up position, and the handle 120 threaded down on the hanger arm 119 until a portion of the handle 120 is received within the enlarged end of the slot. The handle 120, having a greater diameter than the vertically elongated slotted portion 63D of opening 63E, will lock the extractor in the inoperative position.

When the extractor is to be used, the handle 120 is backed off the hanger rod until it is freed of the enlarged opening 63C. When this occurs the hanger rod 119, being of less diameter than the slot 63D is free to drop therein, thereby permitting the extractor to be lowered to engage the stud. In the operative or lowered position, the key 116A of the stud extractor in key way 118 of the drawbar 63 locks the stud to the drawbar 63 so that upon rotation of the drawbar, the stud is rotated since the hex plug 117 will be engaged with recessed portion 55B of the stud.

In the event a stud should be seized to the vessel, a hammer means 121, as shown in FIGS. 18 and 19, which is a modification of FIG. 2 may be incorporated in the upper end of the drawbar 63 in lieu of the radial spokes 110 to provide a means to impart a sharp impact to the stud to loosen the same. In this modification a transversely extending anvil 122 is connected to an anvil collar 129 threaded to the upper end of the drawbar, the anvil having outer ends 122A extending outwardly beyond the circumferential edge of the collar. A hammer wheel hub 123 is rotatably mounted to the collar 129. The wheel hub 123 is provided with opposed notched portions 123A adapted to receive the outer ends 122A of the anvil. As shown, the notches 123A are larger than the anvil ends 122A. This affords the hammer wheel hub 123 a certain amount of rotary motion to impart momentum to jar the stud loose. Extending radially of the hammer wheel hub are a plurality of spokes 124 co-operating to form a hand wheel 125, by which the hammering means is operated. In the event the stud is seized, the hammer means 121 is used to impart a sharp impact to the anvil 122, which in turn is transmitted through the drawbar and extractor locked thereto, thence to the stud. With the arrangement described, the stud can be readily jarred loose without damage to the stud threads. With the stud thus loosened continuing engagement of the anvil ends 122A with the notch 123A provides the drive by which the stud may be extracted upon continued rotation of the hammer wheel 125.

Control means for the tensioner 50 comprises a fluid operated circuit which is compactly arranged on the mounting plate 90 of the power pack 60 shown in FIG. 9. The basic components of the circuit as shown in FIGS. 2, 10, 11, 12 and 17 include a low pressure air motor-hydraulic pump combination 141, a combined air regulator, filter and lubricator 142, an air valve 143, a hydraulic valve 144, an oil filter 145 and connected pipe means and couplings. The various components 142 to 145 are interconnected in a circuit so that control may be had through the actuation of a single operating lever 146. Accordingly the lever 146 is connected to the stem of the air valve and has three settings as will be hereinafter described.

The combination air motor-hydraulic pump 141 includes a piston type air pump arranged to develop high pressures through application of the principle of differential areas. The pump 141 employs a large piston area which is air driven by a relatively low pressure air source, as for example 60–100 p.s.i. to drive a small area piston which displaces correspondingly small volumes of hydraulic fluid at relatively high pressure. The higher pressure developed by the small area piston is a function of the ratios of the areas of the driving piston and the driven piston and the operating air pressures applied. As shown in FIGS. 2 and 8 to 12, the pump 141 is connected directly to the mounting plate 90 on the side of the power unit 60 and is designed to pump hydraulic fluid, for example oil, directly from the reservoir chamber 86 to oil chamber O of the cylinder. The arrangement is such that only a relatively short coupling 153, FIG. 9, is required to connect the reservoir chamber in communication with the oil inlet of the pump and a similar short coupling 153A, FIG. 9, connects the oil outlet of the pump to the oil chamber O of the cylinder.

Figure 17:
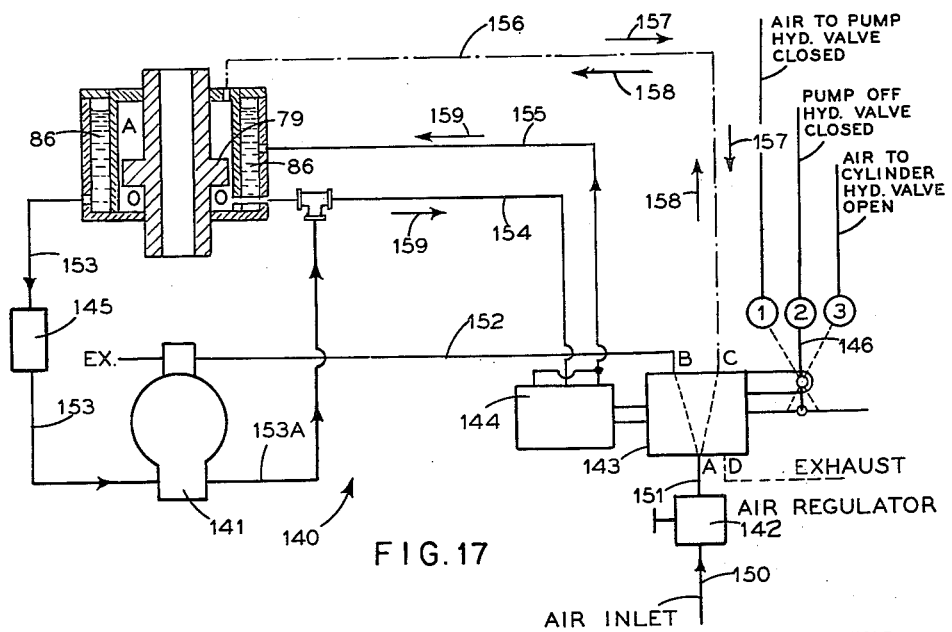
FIG. 17 is a schematic diagram of the fluid circuit for operating the tensioner illustrated in FIG. 2.

As shown in FIG. 17, the oil filter 145 is disposed in line 153 connecting the reservoir 86 with the pump 141.

Air valve 143 and hydraulic valve 144 are likewise mounted on the plate 90 in juxtaposition to the air pump. The air valve 143 is a stem-operated, four-way valve having a port A connected to the air supply, a port B connected to the pump, a port C connected to the air chamber A of the cylinder, and a port D to the exhaust line. The single handle or lever 146 connected to the air valve stem sequentially controls the port openings for selectively supplying low pressure air to either the air inlet end of the pump 141 or to the air chamber A of the cylinder.

The hydraulic valve 144 is a stem operated two-way valve to control the flow of oil to and from the oil chamber O of the cylinder and the reservoir 86. Preferably the air valve 143 and hydraulic valve 144 are mechanically linked so that upon actuation of the operating lever 146, the valves 143, 144 are simultaneously operated to sequentially control the flow both of the hydraulic fluid and of the air in a predetermined flow pattern.

Referring to FIG. 17, the operation of the control circuit 140 schematically illustrated, is as follows:

The combined air regulator, filter and lubricator unit 142 receives relatively low pressure compressed air from a suitable supply, not shown, through an air line 150. The outlet of the regulator unit is connected by conduit 151 to the inlet or supply port A of the air valve 143, and provides the circuit with lubricated, moisture-free air at substantially constant pressure. With the operating lever 146 set to position 1, as indicated in FIG. 17, the air valve port A from supply is open to port B to pump, and the port C to chamber is open to exhaust port, D. With the valve ports so arranged, air is permitted to flow through line 152 connecting the valve port A with the air inlet end of the pump 141 to actuate the same, and is then exhausted therefrom upon completion of its work. Actuation of the pump 141 creates a flow of hydraulic fluid from the reservoir 86 through lines 153, 153A to the oil chamber O of the cylinder. An oil filter 145 is shown disposed in line 153.

The hydraulic valve 144, which is coupled to the air valve 143, is closed at this setting, thus preventing the return of the hydraulic fluid to the reservoir through lines 154, 155. Consequently, hydraulic pressure is built up within the oil chamber O and, acting on the piston 79, forces the piston 79 upwardly to provide the power stroke for axially elongating the stud in tension. The air above the piston, upon displacement by the piston stroke, is forced to flow through line 156 in a direction indicated by arrow 157 to the air valve 143 and is exhausted therefrom through port D.

The power stroke may be terminated and the piston 79 locked in place by movement of the operating lever to position 2, as indicated in FIG. 17. In this position the air valve 143 is connected so that the port B to pump and the port D to exhaust are closed, thus preventing any further flow of hydraulic fluid to the oil chamber O of the cylinder, and exhaust of air from air chamber A. The hydraulic valve is maintained closed at this setting to insure the equilibrium state.

Release of the fluid pressure acting on piston 79 is had by movement of the operating handle 146 to position 3. In this setting the hydraulic valve 144 is moved to open position, and the air valve port, C, to air chamber A of the cylinder is open to the air supply port A as port B to port A is closed. The position of the air valve ports is arranged to permit air to flow from supply to the air chamber A of the cylinder through air line 156 in the direction indicated by arrows 158.

The pressure of the air acting on the top of the piston 79 forces the latter downward. With the hydraulic valve open at this setting, the downward displacement of piston 79 forces the hydraulic fluid from the oil chamber O, the displaced fluid returning from the cylinder chamber O to the reservoir 86 through lines 154 and 155 in the direction indicated by arrows 159.

The operation of the tensioner 50 for stressing a stud in tension is described as follows:

The tensioner 50, suspended from a suitable overhead support rig (not shown) is initially positioned over the stud 55A, to be stressed by relative adjustments of the thrust nut 64 and cable 106. With the tensioner properly positioned, cables 106 taut, and air supply line 150 connected thereto, the pedestal 59 and connected cylinder 60 are raised relative to the piston 79 to an indexed position mark 0 on the guide pins 128. This is accomplished by setting the operating lever 146 to setting 3 to admit air into the air chamber A of the cylinder, as viewed in FIG. 17. This causes the piston 79 to be bottomed and the cylinder-pedestal assembly to rise relative thereto. This action as just described provides the tensioner with an inherent jacking feature which is utilized to advantage in indexing the relatively heavy and bulky tensioner 50 from one stud to the next.

In this position the thrust nut 64 is locked in place by aligning one of its notches 64C with the lock pin 108 and seating the lock pin. With the thrust nut 64 locked, the drawbar 63 is adjusted to position indicated by marker A on the pedestal, shown in FIG. 1, by rotating the drawbar. With the drawbar adjusted to marker A, the pedestal 59 of the tensioner 50 is lowered from guide pin position mark 0 to guide pin position mark 1, FIG. 13, by exhausting air from the cylinder by moving lever 146, to position 1, FIG. 17. As the cylinder approaches the guide pin position mark 1, relative movement of the piston with respect to the cylinder is ceased by moving the operating lever to setting 2, as before described with reference to FIG. 17.

With the tensioner located at guide pin position 1, the drawbar 63 is rotated to a position indicated by marker B on the base of the pedestal, shown in FIG. 1. Marker B designates the point at which the insert 103 in the extreme end of the retainer ring 104 at the end of the drawbar, as shown in FIG. 16, is about to engage the threads of the stud. To facilitate actual thread engagement between the drawbar 63 and the stud, without causing damage to the stud, the lock pin 108 securing the thrust nut 64 is released permitting the drawbar 63 and thrust nut 64 to be rotated together. By manually turning the thrust nut 64 and drawbar 63 together, a "feel" of actual thread engagement can be had. The spring plungers 107 floating the thrust nut 64 and connected drawbar 63 allow the drawbar to be pressed downward to aid in engaging the threads. Upon engagement of the drawbar with the stud, the thrust nut 64 is again locked to the top of the cylinder assembly by seating the lock pin 108 as hereinbefore described. The drawbar 63 is then threaded onto the stud to a point indicated by marker C, as shown in FIG. 1, to provide the required thread engagement thereby insuring a firm connection therebetween.

With the drawbar 63 fully threaded to the stud, the tensioner 50 is lowered, by movement of the operating lever 146 to setting 1, to a resting position on the vessel flange. The flexible connection or links 102 between the pedestal 59 and cylinder assembly 60 first permit positioning the tensioner pedestal on the flanged closure, irrespective of misalignment which may occur between the tensioner and the stud. The tensioner power unit assembly 60, which is held in alignment by the stud, is then brought to rest on the pedestal with the universal joint 62 accommodating misalignment, if any, between the tensioner and the stud. The tensioner is now ready for the application of the power stroke which will elongate the stud in tension.

Actuation of the tensioner to exert the power stroke is had by moving the operating lever 146 to position 1, see FIG. 17. As described, this permits oil to be pumped from the reservoir to the oil chamber O to exert a fluid pressure on the bottom of the piston 79. The force exerted by the displacement of the piston upwardly is, in turn, transmitted through the thrust nut 64 to the drawbar 63, and thence from the drawbar to the stud to elongate it.

Meanwhile, the reactive force is imparted through the pedestal 59 to the vessel flange causing the flanged closure and pressure vessel body to be drawn together. The compressive force acting on the flanged closure and the vessel body may be so large that there will be a tendency for the flange to rotate due to the heavy load occasioned by stressing the stud in tension, with the result that axial misalignment will occur between the center line of the tensioner and the stud. Unless this misalignment is accommodated, a bending moment will be imparted to the stud. Such undesirable moment can seriously damage the stud, the tensioner and/or the component parts of the vessel. To avoid such damage a universal joint 62, including a spherical washer set, disposed between the power pack 60 and the pedestal 59 allows for some degree of misalignment to occur without imposing on the system undesirable bending loads.

When the desired tension or stud elongation is reached, the operation of the pump is stopped and pressure maintained by moving the lever 146 to setting 2, as shown in FIG. 17. With the stud elongated and maintained stressed in tension, the mating nut 57 may be threaded onto the stud by turning a wrench engaging the castellated upper end of the nut until it is seated on the vessel flange without twisting, bending or galling the stud.

With the nut 57 turned down, the hydraulic pressure acting on the piston 76 is now relieved by moving the lever 146 to setting 3. The drawbar 63 is then unthreaded from the stud and raised to the position indicated by mark A on the pedestal by rotating the drawbar. After the drawbar has been completely disengaged from the stud, the tensioner is raised to guide pin position marked 3 by again moving the operating lever to setting 3. As previously described, air is thus introduced into cylinder chamber A, causing the tensioner-pedestal to be raised off the vessel flange, readied for indexing to the next stud and the operation repeated.

Because of the open end pedestal construction and the inherent jacking feature of the tensioner herein described, indexing the tensioner from one stud to another can be accomplished without raising the tensioner above the height of the stud.

To facilitate a closure operation and to insure uniform flange seating, two or more tensioners positioned at opposed points of the vessel flange may be operated simultaneously in the manner herein described.

The operation of the stud tensioner 50 in removing a stud 55A, as for example preparatory to a seal weld cutting operation, is as follows:

With the studs 55A seated in tapped holes 53A in the vessel flange 53 and tensioned by their respective nuts 57, the tensioner 50 is positioned over the stud to be removed and brought into engagement therewith as hereinbefore described with respect to the stud stressing operation. After the drawbar 63 has been firmly secured by threading to the stud 55A and before the power stroke is applied thereto, the stud extractor 114 within the drawbar 63 is released by unscrewing handle 120, allowing the stud retractor to drop into operative position. If necessary, the drawbar 63 is rotated slightly to enable the plug or wrench end 117 of the extractor to drop into engagement with the socket 55B in the upper end of the stud. The drawbar 63 and stud 55A are thus locked together since the drive head keys 116A of the extractor are disposed in the drawbar keyway 118.

With the drawbar 63 and stud thus locked together, the stud is elongated, as hereinbefore described, an amount sufficient to permit loosening of the nut. Then the nut 57 is backed off several turns.

After the nut 57 has been loosened, the hydraulic pressure maintaining the stud in tension is released. The thrust nut 64 is then unlocked by releasing the lock pin 108 and rotated to compress the thrust nut plungers 107 to float nut, drawbar and stud.

The stud 55A is then unscrewed from the vessel flange 53 by rotating the drawbar 63. In the event the stud 55A is seized or frozen in position, an initial impact to jar the stud loose may be imparted by use of the hammer mechanism 121, shown in FIG. 18. The seizure thus broken, stud 55A is then readily unthreaded by continued rotation of the drawbar. After unthreading the stud, free of the flange 53, the thrust nut 64 is again secured by seating the lock pin 108. The drawbar 63 with the stud 55A connected thereto through the stud retractor 114 is then raised up into the tensioner by rotation of the drawbar.

Following disengagement, the drawbar 63 and stud 55A are supported by hydraulic pressure attained by moving the operating lever 146 to setting 1, and the drawbar raised to the limit of the hydraulic cylinder. With the stud removed and raised, a seal cutting or welding machine (not shown) is free to engage the seal weld 58 without interference with the stud.

To reset the removed stud, the drawbar 63 and connected stud 55A are lowered by relieving the hydraulic pressure acting on the piston 79 to bottom the piston, with final lowering of the stud followed by rotation of the drawbar 63 until the lower end of the stud enters the tapped hole 53A. Rotation of the drawbar 63 is continued, carefully to avoid cross mating of the threads, until the stud is threaded all the way into the tapped hole 53A in the vessel flange 53. With the stud fully seated, the hammering wheel may be used to secure the stud in the flange 53.

With the stud in place, the stud extractor 114, FIGS. 20 and 22, is disengaged from the stud by raising the extractor to the inoperative position as herein described. Screwing the extractor handle 120 inwardly locks the extractor 114 into the locking hole at the top of the drawbar slot 63A. Now the stud 55A is then readied to be stressed, the nut 57 tightened and the tensioner 50 removed from the stud and readied to be indexed to the next stud in the manner hereinbefore described.

FIGS. 20 to 22 illustrate a modified form of the invention. As there shown, the tensioner 250, like that of FIG. 2 comprises essentially a pedestal 259, a power pack assembly 260, flexible coupling 261, a universal joint 262, drawbar 263, thrust nut 264 and associated stud extractor 114, all constructed and operatively associated with respect to one another in the same manner as hereinbefore described. Therefore detailed description of this apparatus need not be repeated.

The tensioner 250 of FIG. 20 differs from that shown and described with respect to FIG. 2 by the inclusion of a means in the form of an air motor 400 to effect rotation of the drawbar 263 for threading and unthreading of the same onto a stud to be stressed or extracted. As shown, the air motor 400 is supported in a bearing 400A, see FIG. 22, above the drawbar 263 with the spindle or shaft 401 of the air motor connected to the drawbar through a flexible coupling 402, as seen in FIGS. 20 and 22. The flexible coupler comprises a flanged collar member 402A, which connects with spindle 401 of the air motor, and a mating collar member 402B which connects with the drawbar 263. Suitable fasteners 403 disposed in a resilient bushing 404 secure the two coupler members 402A and 402B, together to connect the drawbar 263 in driving relationship with respect to the air motor 400.

Support for the air motor 400 comprises a clamp 405 arranged to embrace the motor bearing member 400A. Connected to opposed sides of the clamp 405 and guiding the air motor 400 for vertical movement, as the drawbar is raised and lowered, are a pair of arms 406, 407 slidably connected with respect to the hanger plate 305. Each arm 406, 407 includes vertical portions 406A, 407A which are arranged to extend through appropriate openings in the hanger plate 305. To facilitate vertical movement of the arms 406, 407 with respect to the hanger plate 305, suitable roller bearing means 408 are disposed about the opening through which the vertical portions 406A, 407A of the arms extend. As shown, support arms 406 and 407 are of tubular construction with flexible air lines 409, 410 connecting the air motor 400 with the source of air supply (not shown) threaded in arm 406, thereby minimizing the possibility of air line entanglement during operation.

The hammering means 321 incorporated in this embodiment is slightly modified from that previously described in order to accommodate the air motor 400. In this form as shown in FIG. 22A, the anvil 322 consists of a plate member provided with a central opening 322B for receiving the air motor shaft 401. Integrally formed on opposed ends of the anvil plate are projecting lugs 322A which extend outwardly beyond the circumferential edge of the anvil collar 329 secured to the upper end of the drawbar 263. Suitable fasteners 330, 330A, such as bolts or the like, connect the anvil 322 to the collar 329 and drawbar 263, respectively. The hammer wheel hub 323 is provided with opposed notched portions, as hereinbefore described, adapted to receive the projecting lugs 322A of anvil 322. The hammer wheel hub 323 is rotatably mounted to the anvil collar 329.

As before described, the hammer wheel notches are larger than the anvil projecting lugs 322A to afford the hammer wheel a limited amount of rotary movement to provide the momentum for imparting to the anvil impact to jar the stud loose. Extending radially of the hammer wheel 323 are spokes 324 which connect to a hand wheel 325 for actuating the same.

Figure 23:
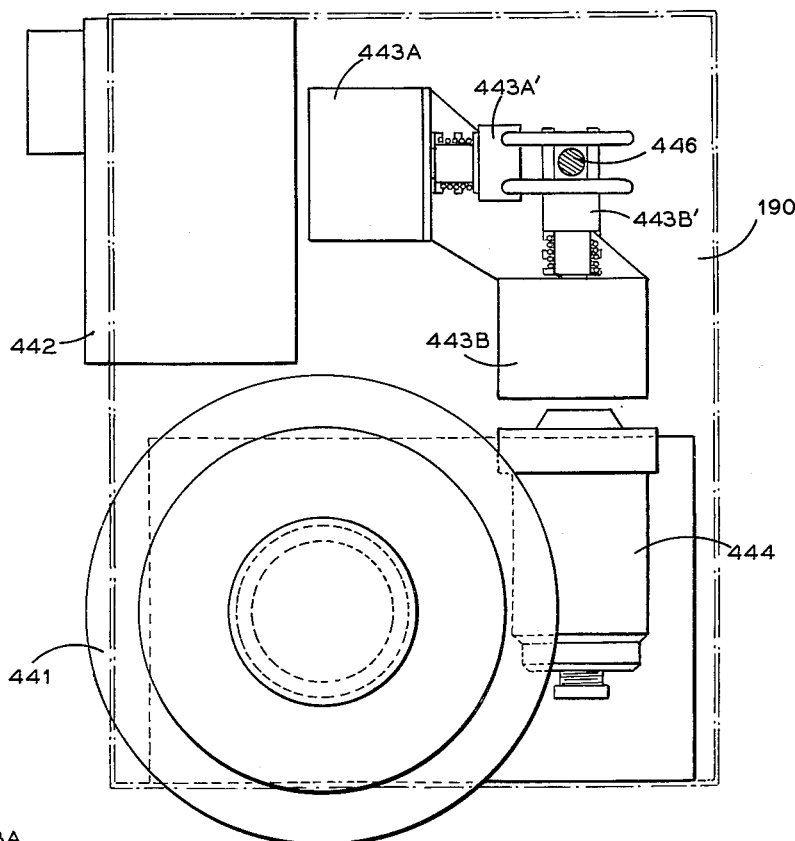
FIG. 23 is a diagrammatic showing of the control assembly for the embodiment of FIG. 20.
Figure 24:
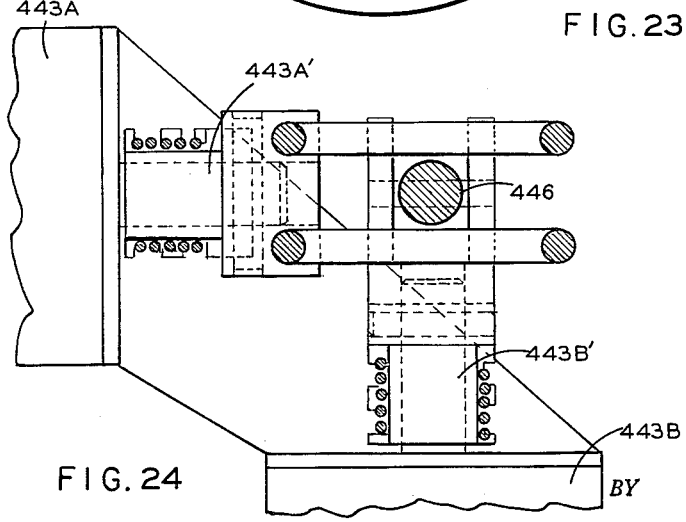
FIG. 24 is an enlarged detail of the operating lever connection of the control assembly of FIG. 23.
Figure 25:
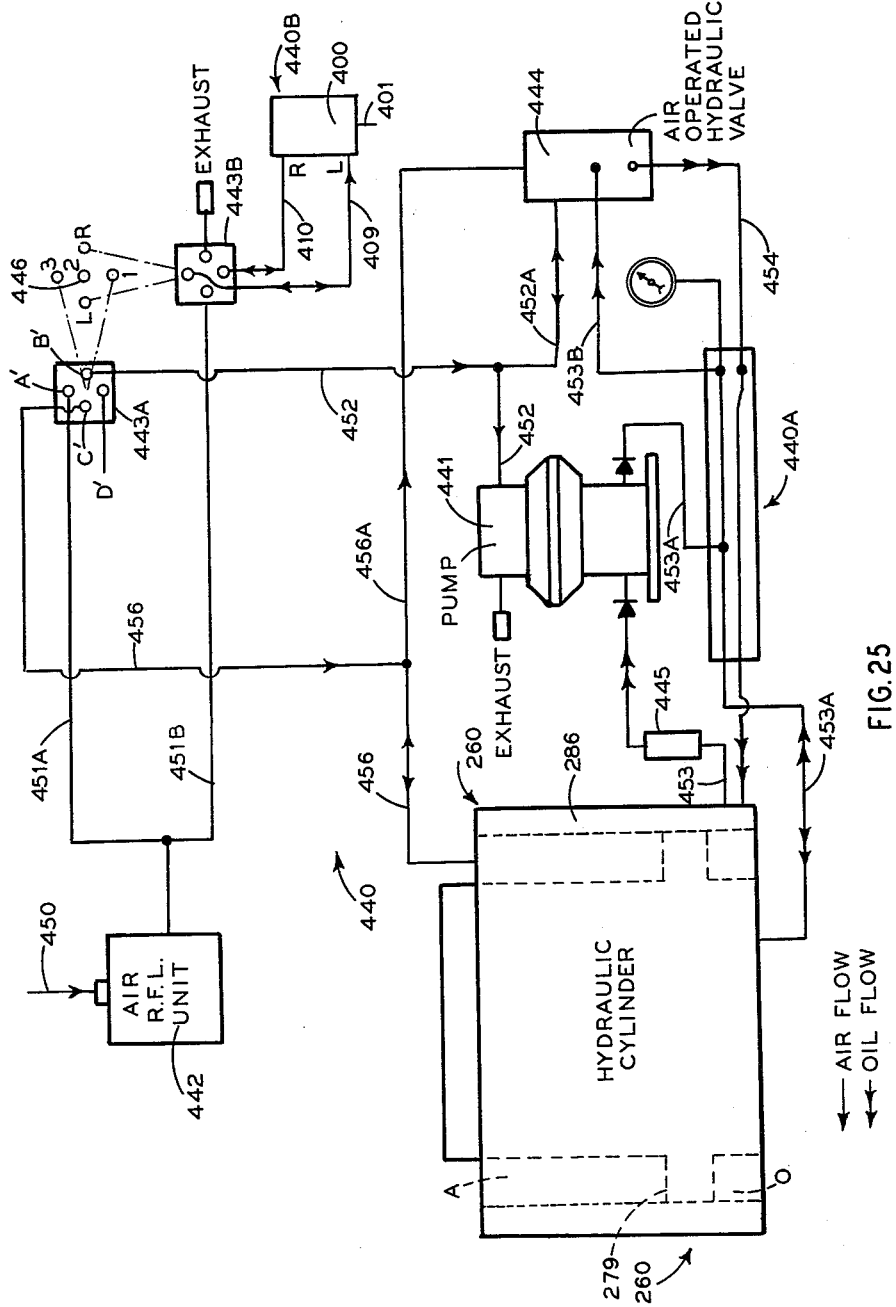
FIG. 25 is a schematic showing of a modified fluid control circuit for actuating the tensioner of FIG. 20.

Control for the tensioner 250 of FIGS. 20 to 22 is had through a modified fluid operated circuit 440, the component parts of which are compactly arranged on the mounting plate of the power pack unit 260. Referring to FIGS. 23 to 25, the basic components of the circuit 440 consist essentially of an air regulator, filter and lubricator 442, two structurally similar, stem operated, fourway air valves 443A and 443B, a pneumatically operated hydraulic valve 444, an air actuated hydraulic pump 441, an oil filter 445, air motor 400 and suitably connected piping and couplings. The various circuit components are interconnected in a control circuit to effect either piston displacement, in a manner similar to that hereinbefore described, or drawbar rotation to engage the tensioner to a stud, or to disengage it, upon actuation of a single operation lever 446.

Referring to FIGS. 23, 24, the two structurally similar air valves 443A, 443B are physically arranged on the mounting plate 190 of the power pack unit 260 so as to have their respective valve stems 443A' and 443B' disposed at right angles. The operating lever 446 is pivoted to form a fulcrum at the apex of the angle formed therebetween. According to this invention, the operating lever 446 is mechanically linked to each of the air valve stems 443A' and 443B' through a suitable linkage arrangement so that movement of the lever in one plane actuates air valve 443A only for energizing the portion of the circuit to effect piston displacement, and movement of the lever 446 to either side of said plane actuates air valve 443B to energize the portion of the circuit to effect drawbar rotation. Thus the control circuit schematically illustrated in FIG. 25 contains a piston actuating circuit portion 440A and a drawbar actuating portion 440B, each individually actuated by a common control lever 446.

Referring to the schematic circuit diagram of FIG. 25, the piston actuating portion 440A includes the air regulator unit 442, air valve 443A, hydraulic valve 444, air actuated pump 441 and oil filter 445, interconnected to effect piston displacement in a manner substantially similar to that described with respect to the circuit of FIG. 17. However, this portion of the circuit has been modified slightly so as to render the hydraulic valve 444 pneumatically responsive to the operation of the air valve 443A, instead of mechanically linking the same to the air valve as hereinbefore described with respect to the circuit 140, FIG. 17. The other components, viz., the pump 441, air regulator unit 442, and air valve 443A are structurally and functionally similar to those hereinbefore described with respect to the circuit of FIG. 17.

The drawbar actuating portion 440B of circuit 440 includes another four-way air valve 443B, which is connected in parallel with respect to air valve 443A and in series with respect to the air regulator 442 and the air pump 400 driving the drawbar 263.

Thus in operation, relatively low pressure compressed air is supplied to the air regulator 442 through line 450 wherein the air for operating either the drawbar actuating portion 440B or piston actuating portion 440A of circuit 440 is at substantially constant pressure. Air leaving the regulator 442 is channelled to air valve 443A through line 451A and to air valve 443B through line 451B. Depending on the position of the control lever 446, the air is permitted to flow either through one valve or the other, i.e. 443A or 443B.

Briefly, the power stroke of the tensioner 250 is effected by moving the control lever 446 to setting 1, as seen in FIG. 25. In this position the ports of air valve 443A are aligned to supply air through line 452 to the pump 441 to energize the same. A portion of this air is bled through line 452A to close the hydraulic valve 444. The pump thus actuates the flow of hydraulic fluid from the reservoir 286 to the pump through line 453 and from there through line 453A to the oil chamber O of the power pack 260. The fluid pressure thus acting on the piston 279 displaces it upwardly to supply the power stroke. Movement of control lever 446 to setting 2, orients the ports of valve 443A to shut off the supply of the air to pump 441 and in effect locks the piston 279 in place, as hereinbefore described. Movement of the lever to setting 3, aligns the ports of air valve 443A to supply air through line 456 to the air chamber A above the piston 279. A portion of the air at this setting is bled through line 456A to the hydraulic valve 444 to actuate the same to open position. In this setting, as described, with respect to FIG. 17, the air pressure acting on the piston 279 forces the same downward causing the hydraulic fluid to flow from the oil chamber O through lines 453A, 453B thence through the open hydraulic valve 444, and from there through line 454 for return to the reservoir 286.

Drawbar rotation is effected by moving the control lever to either of settings identified by L or R, FIG. 25. Movement of lever 446 to position L orients the ports of valve 443B only so that air is supplied through line 409 to the air motor in a manner to effect drawbar rotation to the left. Movement of the lever to position R reverses the port opening of valve 443B so that air flows through line 410 to effect drawbar rotation to the right. The lever in setting 2 maintains the tensioner 250 in neutral or inactive position.

While in accordance with the provisions of the statutes there is illustrated and described herein the best form and mode of operation of the invention now known to the inventors, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A stud tensioner for facilitating assembly and disassembly of parts joined by nut and stud means comprising a pedestal adapted for supporting said tensioner over a stud to be tensioned, a drawbar adapted to extend axially of the stud and having means on one end thereof adapted to connect the end of the stud, a thrust nut connected to the other end of the drawbar, a power pack disposed about said drawbar between the thrust nut and the pedestal for exerting a force in tension which is transmitted through said thrust nut to said drawbar to the stud to effect axial elongation of the stud, said power pack including a cylinder and fluid actuated piston for exerting the force in tension on said thrust nut, means forming a universal joint operatively associated between said power pack and pedestal to permit relative movement between the pedestal of the power pack in the event of misalignment between the stud and the tensioner, and a plurality of flexible links connecting said power pack to said pedestal.

2. A stud tensioner for facilitating assembly and disassembly of parts joined by nut and stud means comprising a pedestal adapted for supporting said tensioner over a stud to be tensioned, a drawbar having means on one end thereof to engage the end of the stud, a thrust nut connected to the other end of said drawbar, a power pack disposed about said drawbar between the thrust unit and the pedestal for exerting a force in tension which is transmitted through the thrust nut to said drawbar to the stud to effect axial elongation of the stud, said power pack including a cylinder and fluid actuated piston, means forming a universal joint disposed between said power pack and pedestal to permit relative movement between the power pack and the pedestal to accommodate for misalignment occurring between the centerlines of the tensioner and the stud, a plurality of flexible links connecting said power pack to said pedestal, a reservoir for containing the piston actuating fluid formed integrally with said power pack, and a control means for directing the flow of fluid between said reservoir and cylinder to actuate said piston for exerting said force in tension.

3. A stud tensioner for facilitating assembly and disassembly of parts joined by nut and stud means comprising a pedestal adapted to be positioned over a stud to be tensioned, a power pack supported on said pedestal, said power pack including a cylinder and fluid actuated piston, said piston having an axial bore extending therethrough, a hollow drawbar having means on one end thereof adapted to engage the end of the stud to be tensioned, said drawbar being arranged to extend upwardly through the bore of said piston, a thrust nut threaded to the other end of said drawbar for adjusting the height of said drawbar assembly relative to said piston, a stud extractor disposed within the hollow drawbar for movement between operative and inoperative position, said extractor having means for engaging said stud in operative position, and means for releasably locking said extractor to said drawbar in the operative position thereof, and means for rotating said drawbar whereby rotation of said drawbar effects rotation of the stud relative to the mated part.

4. The invention as defined in claim 3, wherein said means for rotating said drawbar includes an air motor operatively connected thereto and means for controlling said air motor.

5. A stud tensioner for facilitating assembly and disassembly of parts joined by nut and stud means comprising a pedestal adapted for supporting said tensioner over a stud to be tensioned, a universal joint including a mating upper concave washer and a lower convex washer supported on said pedestal, a base plate supported on said upper washer, flexible means connecting said base plate to said pedestal, a power pack connected to said base plate, said power pack including a cylinder and fluid actuated piston, said piston having an axial bore extend therethrough and said piston having a ram, a drawbar having means on one end thereof adapted to connect to the end of the stud to be tensioned, said drawbar extending upwardly through said washers, base plate and bore of said piston, a thrust nut threaded to the other end of said drawbar for adjusting the height of said drawbar relative to said piston, said thrust nut including means for counterbalancing the weight of the drawbar connected thereto to float the same when not in tension, a hanger plate disposed between the piston ram and thrust nut, hoisting means connected to said hanger plate for suspending said tensioner, a reservoir for containing the piston actuating fluid formed integrally with said power unit, control means including a low pressure fluid actuated control circuit for regulating the flow of fluid between said reservoir and cylinder to exert a relatively large force to said piston which is transmitted in tension through said drawbar to the stud to effect axial elongation thereof so that the mating nut of said stud may be tightened or loosened thereto without subjecting the stud to torsional or blending loads.

6. A stud tensioner for facilitating assembly and disassembly of parts jointed by nut and stud means comprising a pedestal adapted for supporting said tensioner over a stud to be tensioned, a universal joint including a mating upper concave washer and a lower convex washer supported on said pedestal, a base plate supported on said upper washer, flexible link connecting said base plate to said pedestal, a power pack connected to said base plate, said power unit including a cylinder and a double acting fluid actuated piston, said piston having an axial bore extending therethrough and a connected ram portion, a hollow drawbar having means on one end thereof adapted to engage the end of the stud to be tensioned, said drawbar extended upwardly through said washers, base plate and bore of said piston, a thrust nut threaded to the other end of said drawbar for adjusting the height of said drawbar assembly relative to said piston, a hanger plate disposed between the piston ram and thrust nut, said thrust nut including spring means for counterbalancing the weight of the drawbar on said hanger plate when not in tension, hoisting means connected to said hanger plate to suspendingly support said tensioner, a reservoir for containing a piston actuating liquid formed integrally with said power pack, control means including a low pressure pneumatically actuated circuit including means for regulating the flow of liquid fluid between said reservoir and one side of said piston to exert a relatively large force thereon which is transmitted in tension through said drawbar to the stud to effect axial elongation thereof so that the mating nut of said stud may be tightened or loosened thereon without subjecting the stud to undesirable bending loads, and means to regulate the flow of a pneumatic fluid to the other side of said piston to raise said tensioner relative to the stud in preparation for moving the tensioner from one stud to another.

7. A stud tensioner for facilitating assembly and disassembly of parts joined by nut and stud means comprising a pedestal adapted for supporting said tensioner over a stud to be tensioned, a universal joint including a mating upper concave washer and a lower convex washer supported on said pedestal, a base plate supported by said concave washer, flexible links connecting said base plate to said pedestal, a power pack connected to said base plate, said power pack including a cylinder and a double action fluid actuated piston, said piston having an axial bore extending therethrough and a connected ram, a reservoir for containing a piston actuating liquid formed integrally with said power pack, a hollow drawbar having means on one end thereof adapted to engage the end of the stud to be tensioned, said drawbar being arranged to extend upwardly through said washers, base plate and bore of said piston, a thrust nut threaded to the other end of said drawbar for adjusting the height of said drawbar relative to said piston, said thrust nut including means for counterbalancing the weight of the drawbar connected thereto to float the same when not in tension, a hanger plate disposed between the piston ram and thrust nut, a stud extractor disposed within said drawbar adapted for movement between operative and inoperative position, means for releasably locking said stud and extractor to said drawbar in the operative position thereof, an air motor for rotating said drawbar so that rotation of said drawbar effects rotation of said stud relative to the mated parts, hoisting means connected to said hanger plate for suspendingly supporting said tensioner, control unit including a low pressure pneumatically actuated control circuit including means for directing the flow of liquid between said reservoir and cylinder for exerting a relatively liquid pressure on said piston which is transmitted in tension through said drawbar to the stud to effect axial elongation thereof so that the mating nut of said stud may be tightened or loosened thereto without subjecting the stud to undesirable bending loads, and means to regulate the flow of a pneumatic fluid to the other side of said piston to raise said tensioner relative to said stud in preparation for moving said tensioner from one stud to another.

8. A stud tensioner for facilitating assembly and disassembly of parts joined by nut and stud means comprising a pedestal for supporting said tensioner over a stud to be tensioned, a drawbar arranged to extend axially of the stud and having means on one end thereof adapted to engage the end of the stud, a power pack connected to the pedestal, said power pack including a cylinder and fluid actuated piston, said piston having an axial bore through which said drawbar extends, the opposite end of the drawbar extending beyond the piston, a thrust nut threaded to the extended opposite end of said drawbar for adjusting the height of said drawbar relative to said piston, said piston being adapted to exert a force in tension which is transmitted through said thrust nut to said drawbar to the stud to effect axial elongation of the stud, and means for counterbalancing the weight of the drawbar to float the same relative to said power pack when said tensioner is rendered inoperative.

9. A stud tensioner for facilitating assembly and disassembly of parts joined by nut and stud means comprising a pedestal for supporting said tensioner over a stud to be tensioned, a drawbar adapted to extend axially of the stud and having means on one end thereof adapted to engage the end of the stud, a power pack connected to the pedestal, said power pack including a cylinder and fluid actuated piston, said piston having an axial bore through which said drawbar extends, the opposite end of the drawbar extending beyond the piston, a thrust nut threaded to the extended opposite end of said drawbar for adjusting the height of said drawbar relative to said piston, means incorporated in said thrust nut for counterbalancing the weight of the drawbar to float the same when not in tension, a reservoir for containing the piston actuating fluid, and a control circuit for regulating the flow of fluid between said reservoir and cylinder to actuate said piston for exerting a force in tension which is transmitted by said piston through said thrust nut to said drawbar to the connected stud to effect axial elongation of the stud.

10. A stud tensioner for facilitating assembly and disassembly of parts joined by nut and stud means comprising a pedestal adapted to fit over a stud to be stressed in tension, a drawbar arranged to extend axially of the stud and having means on one end thereof adapted to engage the end of the stud, a power pack connected to the pedestal, said power pack including a cylinder and a fluid actuated piston having a bore therein through which said drawbar extends, the opposite end of the drawbar extending beyond the piston, a thrust means connected to the extended opposite end of the drawbar so that said piston is adapted to transmit a force thereto, means defining a reservoir chamber mounted on said cylinder for containing a liquid fluid, and a control means including a hydraulic circuit entirely contained in said power pack for directing the flow of liquid between the reservoir chamber and the cylinder to build up a liquid pressure on said piston during a stud stressing operation to exert a force on said thrust means, the force being transmitted through the drawbar in tension and to the stud to effect axial elongation of the stud, and a relatively low pressure pneumatic circuit contained in said power pack and having an external low pressure supply line connected thereto for pumping the liquid through and controlling said hydraulic circuit to build up a relatively high hydraulic pressure in said piston means during a stud stressing operation.

11. A stud tensioner for facilitating assembly and disassembly of parts joined by nut and stud means comprising a pedestal adapted to fit over a stud to be stressed in tension, a drawbar arranged to extend axially of the stud and having means on one end thereof adapted to engage the end of the stud, a power pack through which said drawbar extends and being connected to the pedestal, said power pack including a cylinder and a fluid actuated piston disposed in said cylinder, said piston having an axial bore through which said drawbar extends, the opposite end of the drawbar extending beyond the piston, a thrust means connected to the extended opposite end of the drawbar and to which said piston is adapted to transmit a tensioning force, means defining a reservoir chamber mounted on said cylinder for containing a liquid fluid, and a control means including a hydraulic circuit contained within said power pack for directing the flow of liquid between the reservoir chamber and the cylinder for exerting a liquid pressure on said piston during a stud stressing operation to create a force on said thrust means, said force being transmitted through the drawbar in tension to the stud to effect axial elongation of the stud, a relatively low pressure pneumatic actuating circuit within said power pack for selectively activating and deactivating said hydraulic circuit for exerting a relatively high hydraulic pressure in said piston means during a stud stressing operation, and a low pressure pneumatically actuated hydraulic pump in said power pack for pumping said fluid from the reservoir chamber into the cylinder.

12. A stud tensioner for facilitating assembly and disassembly of parts joined by nut and stud means comprising a pedestal adapted to fit over a stud to be stressed in tension, a drawbar arranged to extend axially of the stud and having means on one end thereof adapted to engage the end of the stud, a power pack connected to the pedestal and including a cylinder and a fluid actuated piston disposed in said cylinder, said piston having an axial bore through which said drawbar extends, the opposite end of the drawbar extending beyond the piston, a thrust means connected to the extended opposite end of the drawbar and to which said piston is adapted to transmit a tension force, means defining a reservoir chamber for containing a liquid fluid, and control means including a hydraulic circuit for directing the flow of liquid between the reservoir and the cylinder for exerting a liquid pressure on said piston to create a force which is transmitted through the drawbar to the stud in tension to effect axial elongation thereof, and a relatively low pressure pneumatic actuating circuit, said hydraulic circuit comprising a two-way hydraulic control valve, hydraulic conduits connecting said two-way valve in series with said reservoir chamber and said cylinder, and a pneumatically actuated hydraulic pump disposed in said line for pumping the liquid from the reservoir into the chamber, and said pneumatic circuit comprising a pneumatic line leading to said pump, a four-way pneumatic control valve connected in said pneumatic line in series with said pump and being operatively associated with said two-way valve, a pneumatic conduit connecting said four-way valve with said cylinder on the other side of said piston, and a control lever connected to said four-way valve for simultaneously operating said valves for sequentially operating the settings thereof to selectively regulate the flow of liquid between the reservoir chamber and the cylinder and the flow of a pneumatic fluid between the four-way valve and said cylinder for either exerting a fluid pressure on said piston which is transmitted through the drawbar and to the stud for stressing the latter in tension, or maintaining said piston in the stressed position of the stud, or regulating the flow of pneumatic fluid to the other side of said piston as the liquid in said cylinder is exhausting through the liquid conduit and connected hydraulic valve to effect raising of the tensioner relative to the stud.

13. A stud tensioner for facilitating assembly and disassembly of parts joined by nut and stud means comprising a pedestal adapted to fit over a stud to be stressed in tension, a drawbar arranged to extend axially of the stud and having means on one end thereof adapted to engage the end of the stud, a power pack through which said drawbar extends and being connected to the pedestal, said power pack including a cylinder and a fluid actuated piston disposed in said cylinder, said piston having a bore through which said drawbar extends, the opposite end of said drawbar extending beyond the piston, a thrust means connected to the extended opposite end of the drawbar and against which said piston is adapted to transmit a relatively large force during a stud stressing operation, means defining an annular reservoir chamber circumferentially arranged on and having its inner wall formed by said cylinder for containing a piston actuating fluid, and a relatively low pressure pneumatically operated control circuit for forcing the flow of fluid between the reservoir chamber and the cylinder to build up a large liquid pressure on said piston during a stud stressing operation to exert a large force on said thrust means, which force is transmitted through the drawbar in tension and to the stud to effect axial elongation of the stud.

References Cited in the file of this patent
UNITED STATES PATENTS

| | | |
|---|---|---|
| 1,353,600 | McBride | Sept. 21, 1920 |
| 1,479,712 | Hallett | Jan. 1, 1924 |
| 1,831,187 | Mohr | Nov. 10, 1931 |
| 1,868,060 | Grebsenstein | July 19, 1932 |
| 2,374,871 | Loveman | May 1, 1945 |
| 2,571,265 | Leufren | Oct. 16, 1951 |
| 2,594,204 | Nowak | Apr. 22, 1952 |
| 2,736,219 | May | Feb. 28, 1956 |
| 2,760,393 | Stough | Aug. 28, 1956 |
| 2,866,370 | Biach | Dec. 30, 1958 |